United States Patent [19]

Henson et al.

[11] Patent Number: 4,980,074

[45] Date of Patent: Dec. 25, 1990

[54] CORROSION INHIBITORS FOR AQUEOUS BRINES

[75] Inventors: Edwin R. Henson, Lake Jackson, Tex.; Peter A. Doty, Midland, Mich.

[73] Assignee: The Dow Chemical Company, Midland, Mich.

[21] Appl. No.: 282,483

[22] Filed: Dec. 9, 1988

Related U.S. Application Data

[63] Continuation-in-part of Ser. No. 921,920, Oct. 22, 1986, abandoned, and a continuation-in-part of Ser. No. 135,416, Dec. 21, 1987, abandoned.

[51] Int. Cl.$^5$ ...................... E21B 41/02; C23F 11/04
[52] U.S. Cl. ............................. 252/8.555; 252/8.514; 252/146; 252/148
[58] Field of Search .................. 252/8.555, 8.514, 146, 252/148

[56] References Cited

U.S. PATENT DOCUMENTS

| | | | |
|---|---|---|---|
| 1,470,225 | 10/1923 | Holmes | 252/146 |
| 1,719,649 | 7/1929 | Chamberlain | 252/148 |
| 2,049,517 | 8/1936 | Saukaitis | 134/41 X |
| 2,073,413 | 3/1937 | Cross et al. | 252/8.512 X |
| 3,025,313 | 3/1962 | Gunderson | 260/404.5 X |
| 3,062,612 | 11/1962 | Le Boucher | 422/12 X |
| 3,432,574 | 3/1969 | Kamal | 260/834 |
| 3,453,203 | 7/1969 | Foroulis | 422/9 X |
| 3,589,860 | 6/1971 | Foroulis | 422/9 X |
| 4,292,183 | 9/1981 | Sanders | 252/8.551 |
| 4,536,302 | 8/1985 | Augsburger et al. | 252/8.551 |
| 4,557,838 | 12/1985 | Nichols et al. | 252/8.555 |
| 4,728,446 | 3/1988 | Doty et al. | 252/8.551 |
| 4,734,259 | 3/1988 | Frenier et al. | 422/16 X |
| 4,938,295 | 7/1990 | Petersen et al. | 252/8.555 X |

FOREIGN PATENT DOCUMENTS 2027686  2/1980  United Kingdom ............ 252/8.555

OTHER PUBLICATIONS

Hudgins et al., in *The Oil And Gas Journal*, Jul. 24, 1961, pp. 91–96.

*Primary Examiner*—Robert L. Stoll
*Assistant Examiner*—Chhaya Sayala
*Attorney, Agent, or Firm*—W. J. Lee

[57] ABSTRACT

A high density brine useful as a drilling fluid for deep wells is rendered corrosion resistant by the incorporation of a soluble aliphatic or aromatic aldehyde with or without olefinic unsaturation and with the use of alkali metal thiocyanates or ammonium thiocyanates. The aldehyde can be reacted with a primary amine prior to use.

19 Claims, No Drawings

CORROSION INHIBITORS FOR AQUEOUS BRINES

CROSS REFERENCE TO RELATED APPLICATIONS

This application is a continuation-in-part of Ser. No. 921,920 filed Oct. 22, 1986 now abandoned and a continuation-in-part of Ser. No. 135,416 filed Dec. 21, 1987, now abandoned.

BACKGROUND OF THE INVENTION

The present invention relates to corrosion inhibitors for use with aqueous brines.

In many oil wells and gas wells, it may be desirable to contain the formation pressure by employing a hydrostatic head. This may be needed during the squeezing of sand consolidation compositions, during perforation operations, during well shut-ins, during gravel packing, or the like. Many well servicing fluids, sometimes referred to as completion or packer fluids, have been employed. These include, for example, drilling muds, brines, water, oil, $ZnBr_2$-$CaBr_2$ solutions, $CaCl_2$, $CaBr_2$ or solutions and the like.

In recent years, deeper, high pressure and high temperature wells have resulted in a need for solids-free, well servicing fluids having higher densities than are currently available. This is particularly true of wells in the Gulf of Mexico (offshore Texas and Louisiana), where higher hydrostatic pressures often require well-servicing fluids having densities in excess of 15 pounds per gallon (ppg). The need for solids-free, higher density well-servicing fluids is met by brines which contain zinc salts, such as zinc halides.

High density brines and their preparations are set forth in U.S. Pat. No. 4,304,677 and U.S. Pat. No. 4,292,183. These zinc-containing brines have the disadvantage of being more corrosive than brines which are substantially free of zinc salts. Therefore, the high density brines, i.e., those brines having densities greater than about 14.5 ppg, are especially corrosive to oil well casings and equipment used in the service of said casings. The corrosion problem is exacerbated by the higher temperatures typically found in the deeper wells in which high density brines are used. Known corrosion inhibitors, such as film-forming amines, which have been used in high density brines do not provide adequate protection from corrosion at the higher temperatures associated with the deep wells in which high density brines typically are employed.

British Patent No. 2,027,686 is typical of the known technology in this area and discloses the use of sulfur compounds and quaternary pyridinium compounds as corrosion inhibitors.

It would therefore be desirable to develop a corrosion inhibitor which could provide increased protection for metals from corrosion caused by high density brines, especially by zinc salt containing high density brines at the higher temperatures found in deep wells.

SUMMARY OF THE INVENTION

The present invention provides high temperature corrosion protection for metals which come in contact with high density brines. The present invention is a composition which comprises:

A high density fluid useful for drilling wells with reduced metal corrosion which comprises:

(A) an aqueous solution of zinc bromide with or without zinc chloride and calcium bromide with or without calcium chloride having a density in the range from about 14.5 to about 21.0 pounds per gallon, (B) 50 to 10,000 parts per million of a member of the group consisting of (i) an aldehyde having the formula

where R is a radical selected from the group consisting of methyl, phenyl, tolyl, and nitrophenyl,
m is 0 to 7,
n is 0 or 1, with the proviso that when
n is 0, m is 0 to 5, and (ii) the reaction product of an aldehyde having the formula

where R is a radical selected from the group consisting of methyl, phenyl, tolyl, and nitrophenyl,
m is 0 to 7
n is 0 or 1, with the proviso that when n is 0, m is 0 to 5, with a primary amine having the formula

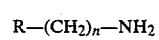

where R is $NH_2$, OH, $CH_3$ or phenyl and
n is a number from 2 to 6, and (C) 250 to 10,000 parts per million of a thiocyanate salt selected from the group consisting of alkali metal thiocyanates and ammonium thiocyanate.

Surprisingly, the compositions of the present invention provide increased corrosion protection when employed with high density brines in deep well applications having temperatures exceeding about 250° F. (121° C.). Further, the present invention results unexpectedly in reduced pitting of metals contacted with a high density brine.

DETAILED DESCRIPTION OF THE INVENTION

The present invention may be employed to reduce the corrosive effects of high density brines upon metals. Metals which typically come in contact with high density brines include iron, steel, and other ferrous alloys, with steel being most common as it widely used in the oil and gas industries. The present invention is particularly effective in reducing the corrosion rate of steel which is contacted with high density brines.

The high density brines employed in the present invention include all brines which contain salts of zinc. It is possible to blend zinc salt-containing brines with lower density brines to obtain brines having densities less than about 14.5 pounds per gallon (ppg). However, the corrosion inhibitor of the present invention is particularly applicable to those brines having a density greater than about 14.5 ppg. Generally, the high density brines are aqueous solutions of certain halides of calcium and/or certain halides of zinc. See, e.g., U.S. Pat. No. 4,304,677 and U.S. Pat. No. 4,292,183 for references to high density brines and their preparation. These patents are incorporated herein by reference.

The soluble aldehyde compounds employed in the present invention inhibit the corrosive properties of high density brines toward metals, especially iron and steel. Typical aldehydes can be alkyl or aryl and those especially preferred are represented by the following formula.

R—(CH)$_m$—(CH=CH)$_n$—CHO where R is methyl, phenyl, tolyl, or nitrophenyl, m is 0 to 7, n is 0 or 1, with the proviso that when n is 0, m is 0 to 5.

Examples of useful aldehydes are cinnamaldehyde, benzaldehyde, acetaldehyde, octylaldehyde, nonylaldehyde, crotonaldehyde, trans-2-hexenal, trans-2-octenal, trans-2-pentenal, trans-2-nonenal, tolualdehyde, and nitrobenzaldehyde.

The aldehyde compounds employed in the present invention may be used in high density brines either alone, as mixtures, as reaction products with amines or they may be used as herein described in any combination with a synergist.

For the purposes of the present invention the amines which may be reacted with the aldehyde compounds include primary amines having the formula R—(CH$_2$)$_n$—NH$_2$ where R is NH$_2$, OH, CH$_3$ or phenyl and n is a number from 2 to 6.

Illustrative examples of such amines are ethylamine, diamines such as ethylenediamine, aromatic amines such as aniline and alkanolamines such as monoethanolamine, diethanolamine, and the like with monoethanolamine being most preferred.

For the purposes of this invention, an effective amount of the aldehyde is in the range from 50 to 10,000 per million with the range from 100 to 5,000 being the preferred amount. The most preferred range is 150 to 2,000 parts per million. The aldehyde-amine reaction product is used in the amount from 250 to 10,000 parts per million and preferably 500 to 5,000 parts per million.

Thiocyanate compounds such as alkali metal thiocyanates or ammonium thiocyanates are used in the range from 250 to 10,000 parts per million. The preferred range is 500 to 5,000 parts per million.

SPECIFIC EMBODIMENTS

The following preparations and examples are given to illustrate the invention and should not be construed as limiting its scope.

Preparation of Trans-Cinnamaldehyde (TCA)/Monoethanolamine (MEA) Reaction Product In a reactor, 500 gms (3.8 moles) of TCA was heated with 250 gms (4.1 moles) of MEA at 120° C. for 8-10 hours. The reaction can be seen to start upon mixing by a slight exotherm and darkening in color. By the end of the reaction period the product is dark brown and very viscous. For easier handling the product may be dissolved in alcohol or other suitable solvent.

Test Procedure 1. Clean metal coupons by sonicating in acetone for approximately 5 minutes and rinsing with fresh acetone, and then weigh them. N-80 steel coupons having a density of 8.53 g/cm and a surface area of 2.1 square inches were rinsed with acetone and then sandblasted prior to cleaning.

2. Place one coupon in each test sample, using 42 ml of test fluid. (The amount of fluid corresponds to 20 ml fluid/in surface area of coupon). The coupons were sealed in 4-ounce glass jars with Teflon lined caps lubricated with silicon grease for the 250° F. tests. Place in cylindrical Teflon holders in aging cells and pressurize to 150 psi with N$_2$ for 350° F. tests. Place test containers in oven at the proper temperature for the desired amount of time.

3. Remove containers from oven and allow to cool. Remove coupons, clean by sonicating in 1 N HCl inhibited with 500 ppm Dowell A120 until scale is removed (not to exceed 2 minutes), and weigh. Corrosion rate in mils per year (mpy) equals:

$$\frac{22,250 \times M}{D \times S.A. \times T}$$

Where:
M = change in mass of coupon (g)
D = density of coupon (g/cm$^3$)
S.A. = surface area of coupon (in$^2$)
T = length of exposure (days)

EXAMPLES 1-2

The above Test Procedure was conducted with various concentrations of inhibitors under the following heat conditions: 5 days @ 250° F. using a 19.55 pounds per gallon solution containing 58.6% ZnBr$_2$-18.5% CaBr$_2$. The results are shown in Table 1.

TABLE 1

| Run | Inhibitor(s) | Inhibitor Concentration(s) (ppm) | Corrosion Rate (mpy) | % Protection Over Control 1 |
|---|---|---|---|---|
| Cntl 1 | 0 | 0 | 283 | |
| Cntl 2 | TCA | 1000 | 247 | 12.7 |
| Cntl 3 | TCA | 2000 | 195 | 31.1 |
| Cntl 4 | TCA | 4000 | 68 | 76.0 |
| Cntl 5 | TCA/MEA reaction product | 1000 | 28 | 90.1 |
| Ex. 1 | TCA/NH$_4$SCN | 1000/1000 | 10 | 96.5 |
| Ex. 2 | TCA/MEA reaction product + NH$_4$SCN | 1000/1000 | 13 | 95.4 |

Table 1 shows that NH$_4$SCN and trans cinnamaldehyde (TCA) when combined with MEA or TCA alone is highly effective as a corrosion inhibitor at 250° F.

EXAMPLES 3 AND 4

The above Test Procedure was repeated with various concentrations of inhibitors under the following test conditions: 5 days @ 350° F. using a 19.29 pounds per gallon solution containing 54.0% ZnBr$_2$-18.9% CaBr$_2$. The results are shown in Table 2.

TABLE 2

| Run | Inhibitor(s) | Inhibitor Concentration(s) (ppm) | Corrosion Rate (mpy) | % Protection Over Control 1 |
|---|---|---|---|---|
| Cntl 6 | 0 | 0 | 258 | |
| Cntl 7 | NH$_4$SCN | 1000 | 251 | 2.7 |
| Cntl 8 | TCA/MEA reaction product[1] | 2000 | 241 | 6.6 |
| Ex. 3 | TCA/MEA reaction product[1] | 1000/1000 | 152 | 41.1 |

TABLE 2-continued

| Run | Inhibitor(s) | Inhibitor Concentration(s) (ppm) | Corrosion Rate (mpy) | % Protection Over Control 1 |
|---|---|---|---|---|
| | +NH₄SCN | | | |

(1) Diluted 50:50 in isopropanol

Table 2 shows that even when the TCA/MEA reaction product-NH₄SCN combination is diluted to a 50% solution, it still gives good protection from corrosion over the controls even at high temperatures such as 350° F.

EXAMPLE 4

The above Test Procedure was repeated with concentrations of various inhibitors under the following test conditions: 5 days @ 250° F. using a 19.2 pounds per gallon solution containing 54.0% ZnBr₂-18.9% CaBr₂. The results are shown in Table 3.

TABLE 3

| Run | Inhibitor(s) | Inhibitor Concentration(s) (ppm) | Corrosion Rate (mpy) | % Protection Over Control |
|---|---|---|---|---|
| Cntl 9 | 0 | 0 | 331 | 0 |
| Ex. 4 | TCA + NaSCN (1) | 176/990 | 28 | 91.5 |

(1) The inhibitor concentration included 110 ppm of N-methylpyrrolidone as a co-solvent to keep the TCA in the aqueous solution.

We claim:

1. A high density fluid useful for drilling wells with reduced metal corrosion which comprises:
   (A) an aqueous solution of zinc bromide with or without zinc chloride and calcium bromide with or without calcium chloride having a density in the range from about 14.5 to about 21.0 pounds per gallon.
   (B) 50 to 10,000 parts per million of a member of the group consisting of
      (i) an aldehyde having the formula $$R-(CH_2)_m-(CH=CH)_n-CHO$$

where R is a radical selected from the group consisting of methyl, phenyl, tolyl, and nitrophenyl,
   m is 0 to 7,
   n is 0 or 1, with the proviso that when n is 0, m is 0 to 5,
      (ii) the reaction product of an aldehyde having the formula $$R-(CH_2)_m-(CH=CH)_n-(CHO$$

where R is a radical selected from the group consisting of methyl, phenyl, tolyl, and nitrophenyl,
   m is 0 to 7,
   n is 0 or 1, with the proviso that when n is 0, m is 0 to 5, with a primary amine having the formula $$R-(CH_2)_n-NH_2$$

where R is NH₂, OH, CH₃ or phenyl and n is a number from 2 to 6, and
   (C) 250 to 10,000 parts per million of a thiocyanate salt selected from the group consisting of alkali metal thiocyanates and ammonium thiocyante.

2. The composition of claim 1 wherein said aldehyde is cinnamaldehyde.
3. The composition of claim 1 wherein said primary amine is monoethanolamine.
4. The composition of claim 1 wherein said thiocyanate salt is an alkali metal thiocyanate.
5. The composition of claim 1 wherein said thiocyanate salt is sodium thiocyanate.

6. A high density fluid useful for drilling wells with reduced metal corrosion which comprises:
   (A) an aqueous solution of zinc bromide with or without zinc chloride and calcium bromide with or without calcium chloride having a density in the range from about 14.5 to about 21.0 pounds per gallon,
   (B) 50 to 10,000 parts per million of an aldehyde having the formula $$R-(CH_2)_m-(CH=CH)_n-CHO$$

where R is a radical selected from the group consisting of methyl, phenyl, tolyl, and nitrophenyl,
   m is 0 to 7,
   n is 0 or 1, with the proviso that when n is 0, m is 0 to 5, and
   (C) 250 to 10,000 parts per million of a thiocyanate salt selected from the group consisting of alkali metal thiocyanates and ammonium thiocyanate.

7. The composition of claim 6 wherein said aldehyde is cinnamaldehyde.
8. The composition of claim 6 wherein said thiocyanate salt is an alkali metal thiocyanate.
9. The composition of claim 6 wherein said thiocyanate salt is sodium thiocyanate.

10. A high density fluid useful for drilling wells with reduced metal corrosion which comprises:
    (A) an aqueous solution of zinc bromide with or without zinc chloride and calcium bromide with or without calcium chloride having a density in the range from about 14.5 to about 21.0 pounds per gallon,
    (B) 50 to 10,000 parts per million of the reaction product of an aldehyde having the formula $$R-(CH_2)_m-(CH=CH)_n-CHO$$

where R is a radical selected from the group consisting of methyl, phenyl, tolyl, and nitrophenyl,
    m is 0 to 7,
    n is 0 or 1, with the proviso that when n is 0, m is 0 to 5, with a primary amine having the formula $$R-(CH_2)_n-NH_2$$

where R is NH₂, OH, CH₃ or phenyl and n is a number from 2 to 6, and
    (C) 250 to 10,000 parts per million of a thiocyanate salt selected from the group consisting of alkali metal thiocyanates and ammonium tiocyanate.

11. The composition of claim 10 wherein said aldehyde is cinnamaldehyde.
12. The composition of claim 10 wherein said primary amine is monoethanolamine.

13. The composition of claim 10 wherein said thiocyanate salt is an alkali metal thiocyanate.

14. The composition of claim 10 wherein said thiocyanate salt is sodium thiocyanate.

15. A process for providing high temperature corrosion protection for metals in contact with high density brines in an oil or gas well which comprises providing:
(A) an aqueous solution of zinc bromide with or without zinc chloride and calcium bromide with or without calcium chloride having a density in the range from about 14.5 to about 21.0 pounds per gallon,
(B) 50 to 10,000 parts per million of a member of the group consisting of
(i) an aldehyde having the formula

R—CH=CH—CHO where R is a radical selected from the group consisting of phenyl, tolyl, and nitrophenyl, and
(ii) the reaction product of an aldehyde having the formula R—(CH$_2$)$_m$—(CH=CH)$_n$—CHO where R is a radical selected from the group consisting of methyl, phenyl, tolyl, and nitrophenyl,
m is 0 to 7,
n is 0 or 1, with the proviso that when n is 0, m is 0 to 5, with a primary amine having the formula R—(CH$_2$)$_n$—NH$_2$ where R is NH$_2$, OH, CH$_3$ or phenyl and n is a number from 2 to 6, and
(C) 250 to 10,000 parts per million of a thiocyanate salt selected from the group consisting of alkali metal thiocyanates and ammonium thiocyanate.

16. The process of claim 15 wherein said aldehyde is cinnamaldehyde.

17. The process of claim 15 wherein said amine is monoethanolamine.

18. The process of claim 15 wherein said thiocyanate salt is an alkali metal thiocyanate.

19. The process of claim 15 wherein said thiocyanate salt is sodium thiocyanate.

* * * * *